US 6,524,441 B2

(12) United States Patent
Ruf et al.

(10) Patent No.: US 6,524,441 B2
(45) Date of Patent: Feb. 25, 2003

(54) PROCESS FOR DETECTING AND CORRECTING A FIBER ORIENTATION CROSS DIRECTION PROFILE CHANGE

(75) Inventors: Wolfgang Ruf, Herbrechtingen-Bolheim (DE); Hans Loser, Langenau (DE); Ulrich Begemann, Heidenheim (DE); Klaus Lehleiter, Mengen (DE)

(73) Assignee: Voith Sulzer Papiermaschinen GmbH, Heidenheim (DE)

( * ) Notice: Subject to any disclaimer, the term of this patent is extended or adjusted under 35 U.S.C. 154(b) by 0 days.

(21) Appl. No.: 09/726,341

(22) Filed: Dec. 1, 2000

(65) Prior Publication Data

US 2001/0000002 A1 Mar. 15, 2001

Related U.S. Application Data

(62) Division of application No. 09/126,808, filed on Jul. 31, 1998, now Pat. No. 6,174,413.

(30) Foreign Application Priority Data

Aug. 2, 1997 (DE) .......................... 197 33 454

(51) Int. Cl.⁷ ............................ D21F 11/00; D21F 13/00
(52) U.S. Cl. ...................... 162/198; 162/DIG. 10; 162/DIG. 11; 162/259; 162/258; 162/322; 162/345; 162/252; 162/253; 162/254
(58) Field of Search ...................... 162/198, DIG. 10, 162/DIG. 11, 259, 258, 322, 345, 252, 253, 254

(56) References Cited

U.S. PATENT DOCUMENTS

| 3,510,374 A | 5/1970 | Walker |
| 3,557,351 A | 1/1971 | Doering |
| 3,609,325 A | 9/1971 | McCarty et al. |
| 3,681,595 A | 8/1972 | Dahlin |
| 3,806,730 A | 4/1974 | Tirkkonen et al. |
| 4,037,104 A | 7/1977 | Allport |
| 4,289,964 A | 9/1981 | Baker |
| 4,707,779 A | 11/1987 | Hu |
| 5,071,514 A | 12/1991 | Francis |
| 5,316,383 A | 5/1994 | Begemann et al. |
| 5,563,809 A | 10/1996 | Williams |
| 5,691,908 A | 11/1997 | Adamy |
| 5,707,495 A | 1/1998 | Heinzmann et al. |
| 5,827,399 A | 10/1998 | Neittaanmäki et al. |
| 6,080,278 A * | 6/2000 | Heaven et al. ............... 162/198 |

FOREIGN PATENT DOCUMENTS

| CA | 2102374 | 5/1994 |
| DE | 2019975 | 11/1971 |

(List continued on next page.)

OTHER PUBLICATIONS

R. Brauns, "Operating Experiences of the Concept IV–MH™ Headbox," *APPITA'95*, pp. 229–234 (1995).

(List continued on next page.)

*Primary Examiner*—Steven P. Griffin
*Assistant Examiner*—Mark Halpern
(74) *Attorney, Agent, or Firm*—Greenblum & Bernstein, P.L.C.

(57) ABSTRACT

Process and a device for detecting a change in the fiber orientation cross-direction profile of a paper or cardboard web in the manufacturing process on a paper or cardboard machine. It is recognized that a change in the fiber orientation cross-direction profile in the web is inferred or determined by way of a characteristic change in the basis weight cross-direction profile or at least one measurement quantity that correlates to it, and/or by way of a characteristic change in the basis weight in the travel direction of the web or at least one measurement quantity that correlates to it. The device includes an arrangement for detecting a change in the basis weight cross-direction profile and/or a characteristic chronological course of the change in the basis weight, which is characteristic for a change in the fiber orientation.

20 Claims, 10 Drawing Sheets

FOREIGN PATENT DOCUMENTS

| | | |
|---|---|---|
| DE | 3102198 | 11/1981 |
| DE | 3535849 | 4/1987 |
| DE | 4005281 | 8/1991 |
| DE | 4019593 | 1/1992 |
| DE | 4112347 | 10/1992 |
| DE | 4238037 | 4/1993 |
| DE | 4239845 | 5/1993 |
| DE | 4211290 | 10/1993 |
| DE | 4211291 | 10/1993 |
| DE | 4239270 | 5/1994 |
| DE | 19542448 | 5/1997 |
| DE | 19634996 | 3/1998 |
| DE | 19634997 | 3/1998 |
| EP | 0408894 | 1/1991 |
| WO | 89/11561 | 11/1989 |
| WO | 91/05105 | 4/1991 |

OTHER PUBLICATIONS

S. Pantaleo, "A New Headbox Design Featuring Consistency Profiling Decoupled from Fiber Orientation Response," TAPPI Proceedings—1994 Engineering Conference, pp. 259–264 (1994).

H. Heinzmann, "Faserorientierungs≦Querprofil," Wochenblatt für Papierfabrikation, vol. 4, pp. 121–126 (1995).

Paetow, "Bewertun von Querprofilen—am Beispiel von OTRO–Querprofilen," *Wochenblatt für Papiermachinenfabrikation*, 3, pp. 83–87 (1995).

\* cited by examiner

PROCESS FOR DETECTING AND CORRECTING A FIBER ORIENTATION CROSS DIRECTION PROFILE CHANGE

CROSS-REFERENCE TO RELATED APPLICATION

The present application is a divisional application of U.S. patent application Ser. No. 09/126,808 filed Jul. 31, 1998 (now U.S. Pat. No. 6,174,413) and claims priority under 35 U.S.C. §119 of German Patent Application No. 197 33 454.7, filed Aug. 2, 1997, the disclosures of which are expressly incorporated by reference herein in their entireties.

BACKGROUND OF THE INVENTION

1. Field of the Invention

The invention relates to a process for detecting and correcting a change in the fiber orientation cross-direction profile of a paper or cardboard web in the manufacturing process of a paper or cardboard machine. Furthermore, the invention relates to a device for detecting and correcting a change in the fiber orientation cross-direction profile in the manufacturing process.

2. Discussion of Background Information

In the manufacture of a paper or cardboard web, there are a large number of interfering factors in the manufacturing process, which can negatively influence the web properties of the paper or cardboard web with regard to its uniformity over the width of the machine used in the manufacture of the web. These interfering factors include, for example, temperature fluctuations, pressure fluctuations, and manufacture tolerances, but also include changes to the machine due to constant wear. Two significant web properties that influence the quality of the paper produced are the desirable, mostly uniform mass distribution of the paper and the desirable, mostly uniform orientation of the fibers in the paper.

The uniform mass distribution assures a favorable basis weight cross-direction profile and a corresponding uniform thickness of the paper layer, while a uniform and correctly aligned fiber orientation has a significant influence on the breaking length ratio, the "curl" of copier papers, and also the running properties of roll papers. In this connection, reference is made to the publications by Robert A. Braun, APPITA 1995, 229 to 234; Scott B. Pantaleo, TAPPI Proceedings, 1994, 259 to 264, and Wochenblatt für Papierfabrikation [Weekly of Paper Manufacturing] 123, February 1995, No. 4, pp. 121 to 126.

For detecting and influencing a web properties profile, such as the basis weight cross-direction profile of a paper or cardboard web, patent document DE 35 35 849 has disclosed measuring the basis weight cross-direction profile of a paper web and, in accordance with the desired change, altering the width of the outlet gap of a headbox at particular locations on the web width so that the flow rate of the stock suspension correspondingly changes locally. The change in the flow rate of the stock suspension, with an even concentration over the width of the web manufacturing machine, influences the quantity of solids at locations on the web and consequently produces an adjustment of the basis weight cross-direction profile.

Patent document DE 40 19 593 A1 discloses a device and a process for regulating the basis weight profile of the web. In this process, when there is a variation of the basis weight profile of the paper web at a particular location on the web width, the concentration of the stock suspension flow should be changed at the particular location. In order to achieve this, a proposal has been made to section the headbox, at least partially, over the width of the machine and to charge the headbox with individually adjustable concentrations with the aid of regulated sectional flows. The individual adjustment of the concentration of the respective sectional flows is carried out by regulating the influx ratios of two individual flows with constant, but different concentrations. The differing content of the sectional flows as regards fibrous material, such as ash and other additives, produces a change in the basis weight at the corresponding location on or across the web width.

Regulating processes for sectional adjustment of headboxes have been disclosed, for example, in patent documents DE 42 38 037 and DE 40 05 281. In these regulating processes, the basis weight cross-direction profile in the paper web is respectively measured and, in accordance with the changes in the basis weight cross-direction profile from the ideal state, the corresponding actuators in the headbox are adjusted in order to achieve the desired basis weight cross-direction profile.

A similar control/regulation device as well as a process for regulating the basis weight cross-direction profile and the fiber orientation cross-direction profile has been disclosed by patent document DE 42 39 845. This document provides for embodying the headbox likewise, at least partially, in sections and influencing the paper stock suspension in its consistency and/or fiber orientation in the individual sections by a supply of dilution water or other fluids in order to regulate the corresponding cross-direction profile. This document, though, does not indicate how the change in a fiber orientation cross-direction profile can be measured.

Furthermore, reference is made to patent document DE 196 34 997, which describes a regulating device with a number of measurement sensors and a process for regulating different web property profiles. The measurement process described in this document, by a number of measurement sensors for determination of the web thickness, describes a measurement process for determining separate basis weight cross-direction profiles and basis weight longitudinal direction profiles in a paper web, wherein the basis weight cross-direction profiles determined by this procedure can be represented free of components of the basis weight longitudinal direction profile. A similar process has also been disclosed by DE 20 19 975.

Patent document DE 196 34 996, which discloses a sectional stock density-regulated headbox with a paper stock consistency regulation. Likewise, patent documents DE 42 11 291 and DE 42 11 290 disclose a sectional stock density regulation of a headbox, with a single valve per section with uniform volume flow. Patent documents DE 40 19 593 and DE 41 12 347 disclose a stock density regulation and volume flow regulation for a sectioned headbox with two valves per section.

The disclosure of the above-discussed documents is expressly incorporated by reference herein in their entirety.

The above-discussed background information does, in fact, represent a number of possibilities with which a fiber orientation cross-direction profile of a paper web can be influenced by the headbox, but none of the foregoing documents explain how a change in the fiber orientation cross-direction profile or the fiber orientation cross-direction profile itself can be measured "on line" during the operation of the paper machine that forms the web. The currently known measuring methods of the fiber orientation cross-direction profile cannot be carried out "on line" or else would require an extremely high degree of expense.

There is the problem, therefore, that before a proper continuous regulation of the fiber orientation cross-direction profile can be carried out in an operating paper machine, a reasonably priced process is required for detecting a change in a fiber orientation cross-direction profile.

SUMMARY OF THE INVENTION

Thus, an aspect of the invention is to provide a reasonably priced process, which can also be carried out "on line", for detecting a change in the fiber orientation cross-direction profile of a paper or cardboard web in the manufacturing process on a paper or cardboard manufacturing machine. Likewise, another object of the invention is to provide a process that can be carried out "on line" for correcting a change in the fiber orientation cross-direction profile or a corresponding regulating process for a preset fiber orientation cross-direction profile. Another object of the invention is to provide devices for carrying out the process according to the invention.

The first aspect of the invention is to provide a process for detecting a change in the fiber orientation in a paper or cardboard web in the manufacturing process of a paper or cardboard web by a machine in which a change in the fiber orientation cross-direction profile in the web is inferred by way of a characteristic change in the basis weight cross-direction profile or at least one measurement quantity that correlates thereto and/or by way of a characteristic change in the basis weight in the travel direction of the web or at least one measurement quantity that correlates thereto.

The inventors of the present invention have recognized that it is possible, during the manufacture of the paper web, to infer or determine a possibly occurring change in the fiber orientation cross-direction profile by analysis of the change in the basis weight cross-direction profile and/or the analysis of the basis weight longitudinal direction profile, i.e. the chronological course of the basis weight.

If the reasons that are causally related to a change in the fiber orientation cross-direction profile of a paper web in the manufacturing process are taken into consideration, then it turns out that as a rule, they correspond to a deformation of the headbox. For the most part, a deformation of the headbox occurs in continuous operation when a temperature change and/or a pressure change occurs in the headbox and, therefore, a change in the headbox geometry occurs. On the one hand, changes of this kind have a characteristic chronological course and on the other hand, they also have a characteristic change profile, i.e. these changes occur over characteristic widths of the web or have characteristic wavelengths.

It is consequently possible to infer or determine a change in the fiber orientation or the fiber orientation cross-direction profile by measuring and evaluating the changes in the basis weight cross-direction profile and/or the changes in the basis weight longitudinal direction profile, i.e. the change in the basis weight in the chronological course of the manufacturing process.

An analysis of the basis weight cross-direction profile can, for example, be carried out by a Fourier analysis. The Fourier analysis supplies a characteristic wavelength spectrum of the changes. If these changes occur in a wavelength range that is greater than a defined critical wavelength, then a change in the fiber orientation cross-direction profile can be inferred or determined with great reliability. The critical wavelength starting from which a change in the fiber orientation cross-direction profile is inferred or determined varies individually from headbox to headbox, since in this connection the respective, structurally conditional embodiments have an influence on the type of deformation of the headbox. It is therefore necessary to precisely define this critical wavelength experimentally. In a first approximation, though, it can be assumed that the critical wavelength lies in the range from about at least 0.5 meters or about at least ⅕ the headbox width, preferably about ½ the inside width (machine width) of the headbox nozzle.

In this connection, it should be noted that the smaller the distance of the measurement of the basis weight cross-direction profile or a measurement quantity that correlates to the basis weight cross-direction profile from the headbox, the greater the fundamental positive effect on the decision process. If the measurement of the basis weight cross-direction profile is only carried out at the end of the paper machine, then a decision with a high degree of success probability is in fact still possible, but the uncertainty increases since other influences coming from the machine after the headbox can cause disruptions.

Correspondingly, another process is proposed for detecting a change in the fiber orientation of a paper or cardboard web in the manufacturing process, which includes at least the following process steps:

repeatedly determining the basis weight cross-direction profile of the web;

determining the change(s) in the basis weight cross-direction profile;

determining the wavelength(s) $\lambda$ of the change(s) in the basis weight cross-direction profile; and, comparing the wavelength(s) of the change(s) in the basis weight cross-direction profile to a predetermined value raster for deciding whether the respective change corresponds to a change in the fiber orientation cross-direction profile.

According to a concept of the invention, it is furthermore also possible to infer or determine a change in the fiber orientation cross-direction profile if only the basis weight longitudinal direction profile is observed in the manufacturing process of the paper web, i.e. the chronological course of the basis weight at a particular position on or across the machine width. If the causes for the change are considered, it turns out that essentially three groups of changes are possible.

There can be instabilities in the constant part of the paper machine. As a rule, these changes occur at relatively high change speeds, preferably greater than about 0.5 g/m$^2$ per minute. These changes are not connected to a change in the fiber orientation cross-direction profile. Also, gradual changes in the basis weight, preferably with change speeds of less than about 0.5 g/m$^2$ per a ten (10) hour interval. These changes indicate an influence from the dewatering conditions in the wet section, for example a continuous screen wear, and do not correspond to a change in the fiber orientation cross-direction profile. Another change is in the basis weight with change speeds between the first and second range discussed. As a rule, these changes indicate a deformation of the headbox geometry, which mostly occurs due to temperature fluctuations. These kinds of changes to the headbox geometry simultaneously induce a change in the nozzle outlet gap and corresponding lateral flow components in the nozzle of the headbox, which in turn lead to a change in the fiber orientation cross-direction profile.

Due to these facts, the invention also proposes a process for detecting a change in the fiber orientation of a paper or cardboard web in the manufacturing process, which includes the following process steps: determining the chronological course of the basis weight of the web in at least one position on the machine width (basis weight longitudinal direction profile); determining the chronological change(s) in the basis weight in the at least one position; determining the change speed $\Delta FG/\Delta t$ or the relative change speed of the basis weight in this at least one location; and, comparing the change speed(s) to a predetermined value raster for deciding whether the respective change speed can correspond to a change in the fiber orientation cross-direction profile. For example, the percentage change in the basis weight in relation to the average value of the basis weight over the entire machine width can be enlisted or used as a relative change speed. However, other fixed, predetermined basis weight values can also be used as a reference point.

It is noted that the term "determining" is not absolutely intended to mean an exact measurement of the basis weight, but that other measurement quantities that correlate to the basis weight can also be used since in this instance, only a determination of the change in the basis weight is required and not an absolute measurement of the basis weight.

An improvement on the two processes for detecting a change in the fiber orientation cross direction profile can be achieved by a combination of these two processes. In this connection, an actual change in the fiber orientation cross-direction profile is assumed if the conditions of the criteria of both of the processes are met.

A further improvement of the detection process of a change in the fiber orientation in a paper web can be achieved by virtue of the fact that with the aid of at least two sensors, the basis weight cross-direction profile and the basis weight longitudinal direction profile of the paper web are measured, whereby a possible deformation of the headbox is inferred or determined from a relevant wavelength of the change in the basis weight cross-direction profile, and in order to verify this change in the basis weight cross-direction profile. The course of the basis weight longitudinal direction profile is determined at the location of this at least one maximum of the change in the basis weight cross-direction profile and the change speed and/or the change frequency at this location is determined from the characteristic chronological course of the basis weight, or the basis weight longitudinal direction profile, in order to infer or determine a possible deformation of the headbox and therefore an influence on the fiber orientation cross-direction profile.

Another feature of the invention is to provide a device for detecting a change in the fiber orientation cross-direction profile of a paper or cardboard web in the manufacturing process on a paper or cardboard manufacturing machine is attained by virtue of the fact that the device includes at least one sensor for measuring the basis weight cross direction profile of the web or a cross-direction profile of a correlated quantity. Furthermore, the device includes an arrangement for determining the change(s) in the cross-direction profile of the basis weight or a quantity that correlates to a change or changes in the cross-direction profile of the basis weight; at least one device for determining the wavelength $\lambda$ of the change(s) and in addition, an arrangement for comparing the wavelengths of the cross-direction profile of the changes to a predetermined value raster for deciding whether the respective change in the basis weight cross-direction profile can correspond to a change in the fiber orientation cross-direction profile and in addition, an output unit for indicating the change in the fiber orientation cross-direction profile.

According to another feature of the invention, the above-mentioned arrangements may include, for example, an arithmetic unit with corresponding computing programs, for example computing modules. Preferably, a Fourier analysis is carried out to determine the wavelengths and the spectral result of the Fourier analysis is evaluated in accordance with the above-described process.

In a simplified aspect of the invention, the device for detecting a change in the fiber orientation cross-direction profile of a paper or cardboard web in the manufacturing process has at least one sensor with an evaluation unit for determining the chronological course of the basis weight in the travel direction of the web in at least one position with regard to the machine width, has at least one unit for determining the change speed $\Delta FG/\Delta T$, or the relative change speed of the basis weight in this at least one position with regard to the machine width, and also has at least one device for comparing the change speed(s) to a predetermined value raster for deciding whether the respective change speed can correspond to a change in the fiber orientation cross-direction profile and has an output unit for indicating the change in the fiber orientation cross-direction profile.

Another aspect of the device according to the invention for detecting a change in the fiber orientation cross-direction profile of a paper or cardboard web in the manufacturing process, has at least one arrangement for determining the basis weight cross-direction profile of the web or a cross-direction profile of a quantity that correlates to the basis weight cross-direction profile of the web, at least one arrangement for determining the chronological course of the basis weight in the longitudinal direction of the web in at least one position with regard to the machine width, at least one arrangement for determining the change speed or the relative change speed of the basis weight in this at least one position with regard to the machine width, at least one unit for comparing the change speed(s) to a predetermined value raster, and also a unit for deciding whether the respective change speed of the basis weight can correspond to a change in the fiber orientation cross-direction profile and an output unit for indicating the change in the fiber orientation cross-direction profile.

Another feature of the device for detecting a change in the fiber orientation cross-direction profile of a paper or cardboard web in the manufacturing process has, according to the invention, at least two sensors and at least one evaluation unit for determining the basis weight cross-direction profile and the basis weight longitudinal direction profile of the paper web, at least one unit means for determining a relative wavelength that indicates a change in the basis weight cross-direction profile due to a possible deformation of the headbox, and also at least one unit for determining the course of the basis weight longitudinal direction profile at the position of the at least one maximum of the change in the basis weight cross-direction profile and for verifying that a possible deformation of the headbox and therefore an influence on the fiber orientation cross-direction profile can be inferred or determined from the characteristic chronological course of the basis weight or from the change speed of the basis weight; and also includes an output unit for indicating the change in the fiber orientation cross-direction profile.

Other features of the invention include providing a process for detecting a change in fiber orientation cross-direction profile of a paper or cardboard web in a manufacturing process on a paper or cardboard manufacturing machine. Aspects of this invention include determining a change in the fiber orientation cross-direction profile in the web by determining a change in at least one of a characteristic change in a basis weight cross-direction profile and a characteristic change in the basis weight in a travel direction of the web. At least one measured quantity correlated to the characteristic change n the basis weight cross-direction profile and the characteristic change in the basis weight in the travel direction of the web is interchangeable with the characteristic change in the basis weight cross-direction profile and the characteristic change in the basis weight in the travel direction of the web.

Included in the other features is a process involving repeatedly determining a basis weight cross-direction profile of the web, determining change in the basis weight cross-direction profile, determining wavelengths of the change in the basis weight cross-direction profile, and comparing the wavelengths of the change in the basis weight cross-direction profile to a predetermined value raster for determining if the change corresponds to a change in the fiber orientation. Another feature relates to determining that a change n the fiber orientation cross-direction profile has occurred when the wavelength of the change in the basis weight cross-direction profile is greater than a predetermined value and, determining that the fiber orientation cross-direction profile is unchanged when the wavelengths in the basis weight cross-direction profile is less than a predetermined value.

Also included in the features is determining a chronological course of a basis weight of the web in at least one position of the web with respect to a width of the machine, determining a chronological change in the basis weight in the at least one position, determining one of a change speed and a relative change speed of the basis weight in the at least one position and comparing one of the change speed and the relative change speed to a predetermined value raster for determining if one of the change speed and the relative change speed corresponds to a change in the fiber orientation cross-direction.

Another feature of the invention determines that a change in the fiber cross-direction profile has occurred when one of the change speed and relative change speed of the basis weight at one position is greater than a first predetermined value and less than a second predetermined value.

Another aspect involves repeatedly determining a basis weight cross-direction profile of the web, determining change in the basis weight cross-direction profile, determining wavelengths of the change in the basis weight cross-direction profile and comparing the wavelengths of the change in the basis weight cross-direction profile to a predetermined value raster for determining if the change corresponds to a change in the fiber orientation.

Another feature is determining that the change in the fiber orientation cross-direction profile has occurred when the wavelength of the change in the basis weight cross-direction profile is greater than a first predetermined value and less than a second predetermined value, and determining that the change in the giver cross-direction profile has occurred when one of the change speed and the relative change speed of the basis weight at one position is greater that a predetermined value and less than another predetermined value.

A further feature is measuring a basis weight cross-direction profile and a basis weight longitudinal direction profile of the paper web by using at least two sensors, determining existence of deformation of a headbox in a machine manufacturing the paper web by determining a wavelength of a change in the basis weight cross-direction profile, determining a course of the basis weight longitudinal direction profile at a position of a maximum change in the basis weight cross-direction profile and determining the existence of deformation of the headbox and influence of the deformation on the fiber orientation cross-direction profile from one of a characteristic chronological course of the basis weight and change of speed of the web.

Another aspect of the process determines a change in the basis weight indirectly by determining a change in a gap width profile of an orifice at an outlet gap of a headbox nozzle in the machine and determining a change in the basis weight indirectly by determining a change in a flow rate of solids in sections of a headbox in the machine.

Other features include counteracting the change in the fiber orientation cross-direction profile by adjusting an orifice in a headbox of the machine, counteracting the change in the fiber orientation cross-direction profile by changing a flow rate of a stock suspension in at least one section of a headbox in the machine, the flow rate of the stock suspension is either increased or decreased in at least one section of the headbox, and correcting a change in the basis weight cross-direction profile and the fiber orientation cross-direction profile in at least one position of the traveling paper web, by using a sectionally stock density-regulated headbox of the paper or cardboard web manufacturing machine, including an adjusting element for sectionally influencing an outlet gap of the headbox, and during correcting of the basis weight cross-direction profile, in order to detect a change in the fiber orientation cross-direction profile, the process for detecting a change in the fiber orientation cross-direction Is performed so that when a change in the fiber orientation cross-direction profile is positively detected, a correction of the basis weight cross-direction profile is performed by adjusting the outlet gap of the headbox, when a change in the fiber orientation cross-direction profile is unnecessary, the correction of the basis weight cross-direction profile is performed by changing a profile of the stock density.

Another feature of the invention is correcting a change in the basis wight cross-direction profile and the fiber orientation cross-direction profile in at least one position of the traveling paper web, with a sectional stock density-regulated and sectional volume flow-regulated headbox, and during correcting of the basis weight cross-direction profile, in order to correct a change in the fiber orientation cross-direction profile, the detection process is performed so that when a change in the fiber orientation cross-direction profile is detected, a correction of the basis weight cross-direction profile is performed by changing the sectional volume flow in the headbox, and when a change in the fiber orientation cross-direction profile is unnecessary, the correction of the basis weight cross-direction profile is performed by changing a profile of the stock density.

Yet another feature of the process is determining one of the basis weight cross-direction profile of the web and a cross-directional profile of a correlated measured quantity by using at least one sensor, determining the change in one of the cross-direction profile of the basis weight and the correlated measured quantity by using at least one determining unit, determining wavelengths of the changes by at least one wavelength measuring device, comparing the wavelengths of the cross-direction profile of the changes to a predetermined value raster for determining if the change corresponds to a change in the fiber orientation cross-direction profile by using a comparing unit and indicating the change in the fiber orientation cross-direction profile in an output unit.

Another feature of the invention is to provide an apparatus for detecting a change in a fiber orientation cross-direction profile in at least one position in a paper or cardboard web in the manufacturing process on a paper or cardboard manufacturing machine, the device including at least one sensor having an evaluation unit for determining a chronological course of a basis weight in a traveling direction of the web in at least one position with regard to a width of the machine, at least one determining unit for determining at least one of a change speed and a relative change speed of the basis weight in said at least one position with respect to the width of the machine, at least one comparing unit for comparing the change speed to a predetermined value raster for determining if the change speed can correspond to a change in the fiber orientation cross-direction profile, and an output device for indicating a change in the fiber orientation cross-direction profile.

Another feature is a device for detecting a change in a fiber orientation cross-direction profile of a paper or cardboard web in a manufacturing process on a paper or cardboard manufacturing machine including at least one determining unit for determining a chronological course of a basis weight in a longitudinal direction of the web in at least one position with respect to a width of the machine, at least one determining element for determining one of a change speed and a relative change speed of the basis weight in at least one position with respect to the width of the machine, at least one comparing unit for comparing the change speed to a predetermined value raster, a determining unit for determining if the change speed of the basis weight corresponds to a change in the fiber orientation cross-direction profile, and an output device for indicating the change in the fiber orientation cross-direction profile.

Another feature includes at least two sensors and at least one evaluation unit for determining a basis wight cross-direction profile and a basis wight longitudinal direction profile of the paper web, at least one wavelength determining unit for determining a wavelength indicative of a change in the basis weight cross-direction profile and a deformation of a headbox of the machine, at least one course determining unit for determining a course of the basis weight longitudinal direction profile at the position of a maximum change in the basis weight cross-direction profile and for verifying a deformation of the headbox and a change in the fiber orientation cross-direction profile being determined from a characteristic chronological course of one of the basis weight and the change speed of the basis weight and, an output unit for indicating the change in the fiber orientation cross-direction profile.

Yet other features of the device include an arithmetic unit including one of an evaluating program and an evaluation sub-program, a controlled motion unit for controlling motion of the at least two sensors in a direction lateral to a direction of the machine, and a first sensor is moveable lateral to a direction of the machine and another sensor is stationary with respect to the machine.

Other features include at least one of the sensors provided in a region of a stock suspension stream emanating from a headbox supplying a suspension to the machine, at least one of the sensors being provided in a region of a former portion and in a region of a press portion of the paper or cardboard web manufacturing machine. Also, at least one of the sensors is provided in a region between a former and a press section and at least one of the sensors is provided in a region between a press section and a drying section of the paper or cardboard web manufacturing machine, and at least one of the sensors measures at least one of stock density, absorption of radioactive radiation, light, ultrasound or for measuring the stream density and the stream speed.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

A fundamental concept of the described invention is that based on the cross-direction profile of the basis weight or a quantity that correlates to the cross-direction profile of the basis weight and/or based on the chronological course of a basis weight change or a quantity that correlates to the chronological course of a basis weight change, it is possible to detect when a change in the fiber orientation cross-direction profile occurs, without having to directly measure such a change. Since the measurement of a fiber orientation cross-direction profile is only currently possible in the "off line" process in actual practice, and respective processes that would permit an "on line" measurement of this kind are extremely expensive, there is the possibility here of a correction or more precisely stated, a keeping constant of the fiber orientation cross-direction profile using a reasonably priced measurement method in the manufacturing process of a paper or cardboard web in the "on line" process. This fundamental principle will be explained in more detail in conjunction with FIGS. 1 to 6.

Figure 1A:
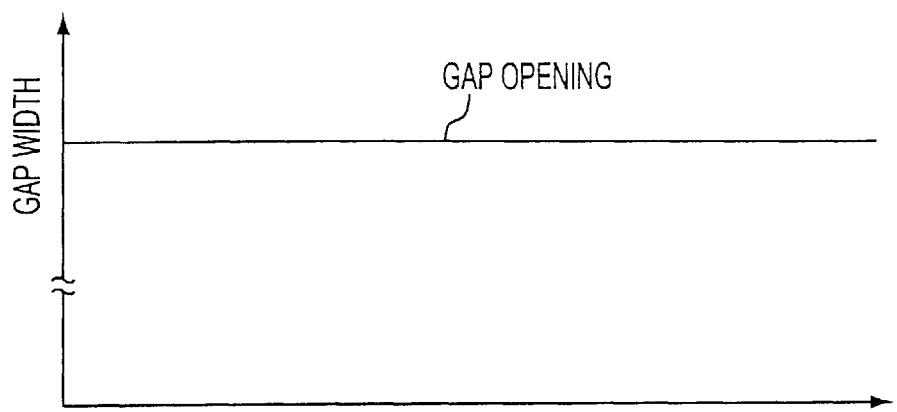
FIGS. 1a, 1b, and 1c are graphic representations of gap width, basis weight cross direction profile, and fiber orientation cross direction profile in the optimally adjusted starting state of a paper machine.

In FIG. 1, three quantities in the operation of a paper machine are represented, in accordance with which an optimal initial adjustment has been carried out. FIG. 1a shows a diagram with a coordinate system in which the gap width is represented in relation to the web width of the headbox gap. The gap width extends at a constant height over the entire web width. This means that the orifice at the outlet gap of the headbox is adjusted so that a parallel gap is produced.

Figure 1B:
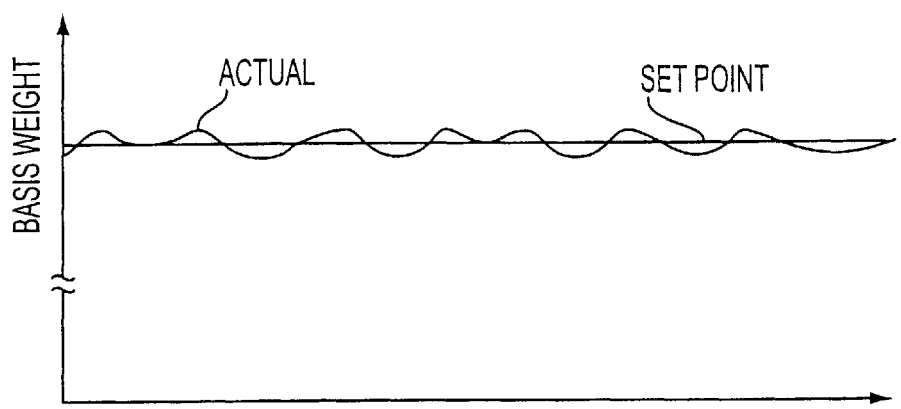

FIG. 1b shows a basis weight cross-direction profile over the web width. The set point of the basis weight and the actual state of the basis weight are represented over the web width. With the use of a sectional stock density-regulated headbox, possible corrections in the basis weight can be adjusted by influencing the sectional stock density.

Figure 1C:
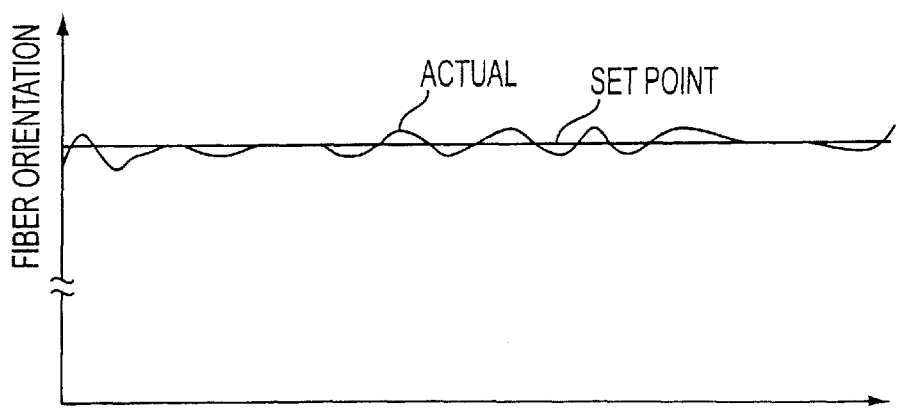

According to the above-mentioned situation of the basis weight and the gap width, FIG. 1c shows a diagram in which the fiber orientation is plotted in relation to the web width, i.e. a fiber orientation cross-direction profile of the paper web. Since the gap width is adjusted so that it is constantly the same over the width, the actual state of the fiber orientation also corresponds to the set point of the fiber orientation cross-direction profile. In the event that changes in the fiber orientation cross-direction profile must be carried out in this starting situation even though the gap width at the headbox is constant, this can be handled with a sectional volume flow-regulated headbox by adjustment to the sectional volume flows. If a sectional volume flow adjustment is not possible, then the correction must be carried out in the gap width of the headbox.

Figure 2A:
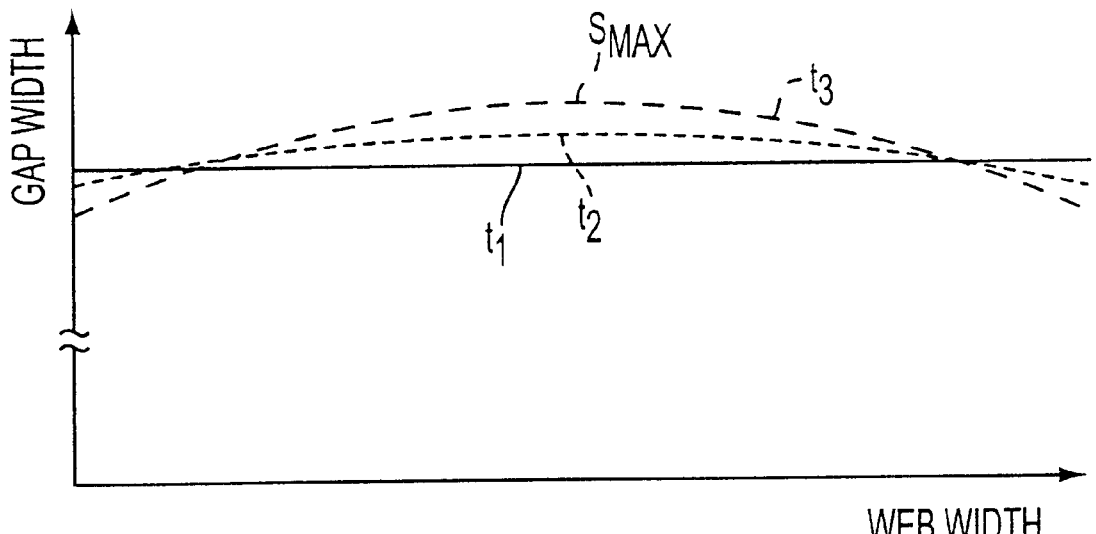
FIGS. 2a and 2b are graphic representations of the chronological course of the gap width and the basis weight.
Figure 2B:
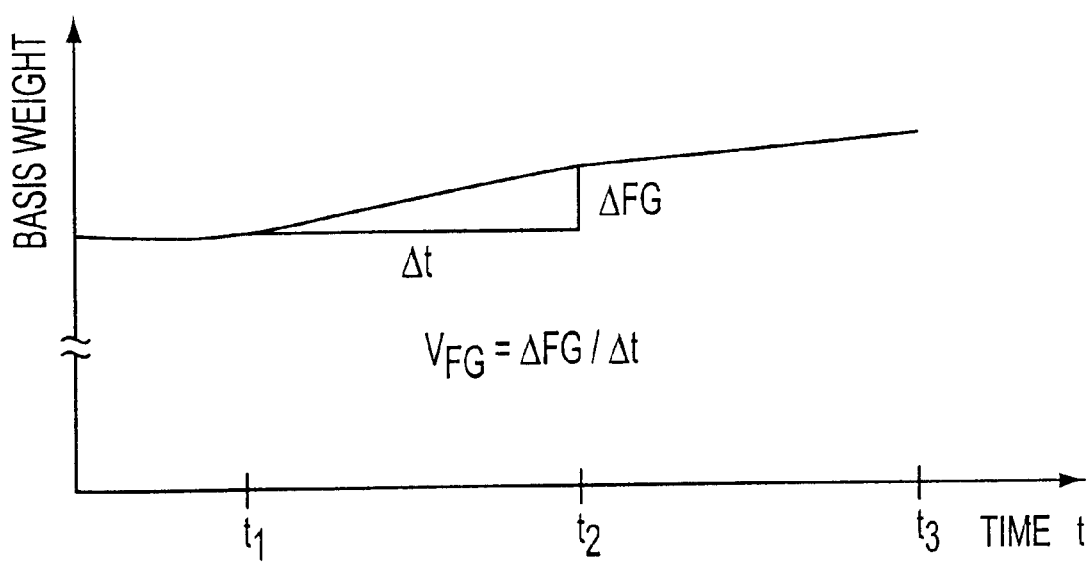

In the operation of the paper machine of the headbox, naturally changes in the headbox gap occur due to temperature fluctuations and other above-mentioned conditions. FIG. 2 shows this kind of a change in the gap width over the machine width in a diagram. Three curves of the gap width s at time $t_1$, $t_2$, and $t_3$ are plotted in this diagram. It is clear that the gap width extends constantly over the machine width at time $t_1$ while a small deformation of the outlet gap already appears at $t_2$, which is further intensified at time $t_3$. A maximum $s_{max}$ of the change in the gap width is also represented in the diagram. The speed of the change in the gap width at this point $s_{max}$ from FIG. 2a is plotted in FIG. 2b. The change speed of the gap width is calculated by $\Delta FG/\Delta t$. There is also the possibility of using a relative basis weight change in lieu of an absolute change speed for assessing the situation in the headbox. This can, for example, represent a basis weight change at a particular point in relation to the average of the machine width basis weight or can represent the change in the basis weight in relation to a predetermined set point.

The change in the gap over the entire machine width, with a wavelength of $\lambda=2\times$machine width, which change is represented in FIG. 2, is not the only possibility for gap deformation of a headbox as a result of temperature fluctuations. It is also possible that the gap of the headbox changes with smaller wavelengths, for example, in accordance with the structural reinforcements in the headbox nozzle. In any case, these changes in the headbox gap will always be characteristic for the respective headbox and correspond to a particular pattern.

Figure 3A:
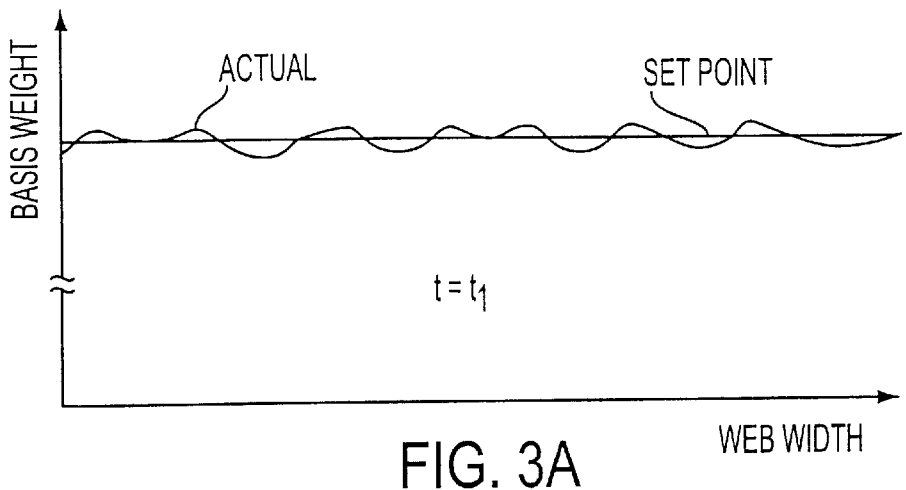
FIGS. 3a, 3b, and 3c are basis weight cross direction profiles at the times $t_1$, $t_2$, and $t_3$.
Figure 3B:
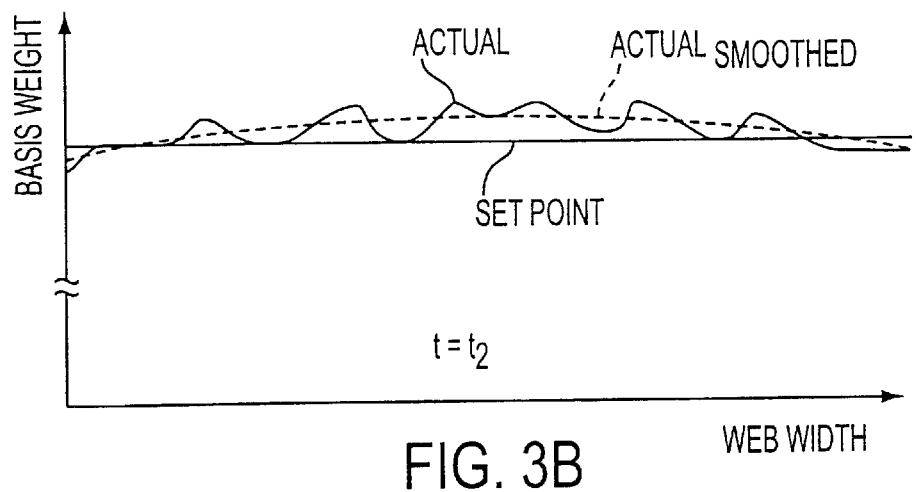
Figure 3C:
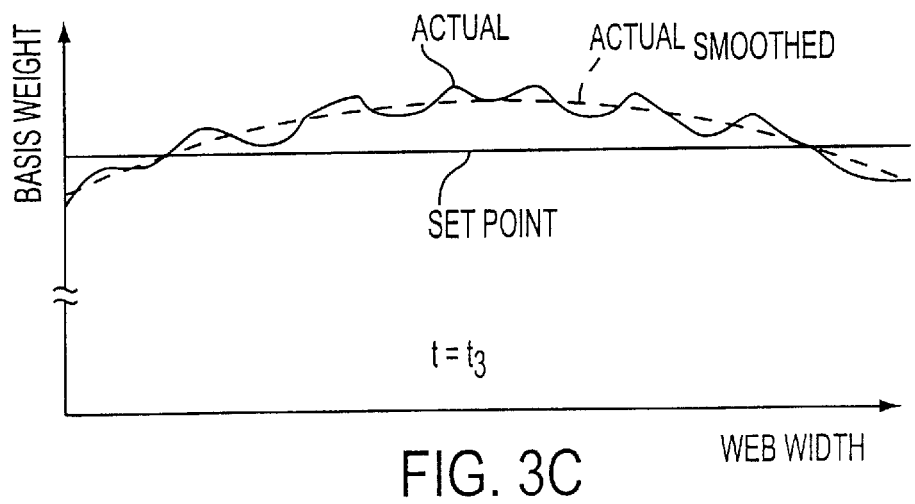

FIGS. 3a, 3b, and 3c, show the respective basis weight cross-direction profiles at times $t_1$, $t_2$, and $t_3$. A comparison of FIGS. 2a and 3a–3c demonstrates that the basis weight change corresponds characteristically to a gap width change or more precisely, corresponds to the change in the gap width profile. In the locations at which the gap is enlarged, an increase in the basis weight also occurs due to the reduced resistance in this region and due to the thus increased volume flow.

Figure 4A:
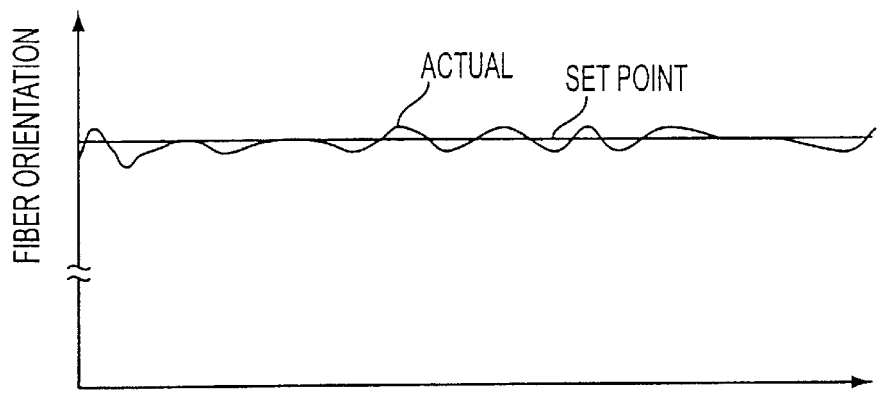
FIGS. 4a, 4b, and 4c show fiber orientation cross direction profiles at the times $t_1$, $t_2$, and $t_3$.
Figure 4B:
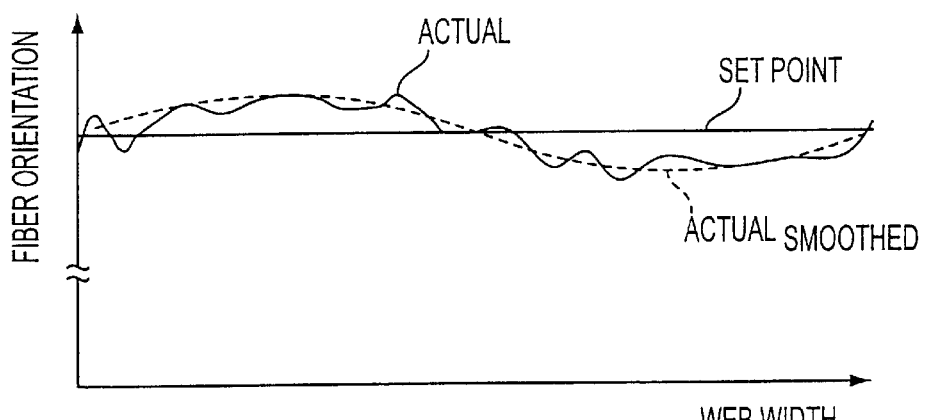
Figure 4C:
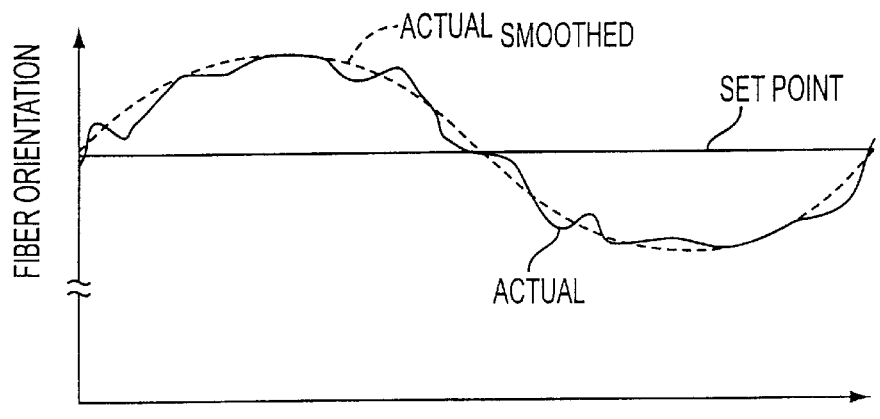

In FIGS. 4a, 4b, and 4c, the corresponding fiber orientation cross-direction profiles are represented at times $t_1$, $t_2$, and $t_3$. Here, too, it turns out that the fiber orientation is disrupted in its profile with the change in the gap width—in accordance with FIG. 2a. The cause for the change in the fiber orientation cross-direction profile is due to the changed outlet gap, lateral flows are generated in the headbox, which are aligned in the direction of the widening gap. The combined action described above thus demonstrates that a corresponding change in the fiber orientation cross-direction profile can be inferred or determined by observing the contour of the change in the basis weight cross-direction profile.

Figure 5A:
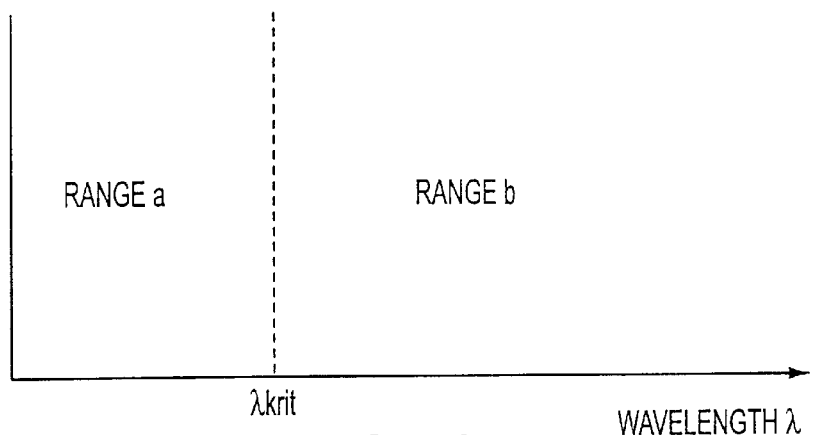
FIGS. 5a, 5b, and 5c are graphic representations of the value raster for identification of a change in the fiber orientation cross direction profile.

FIG. 5a represents a selection criterion from which a change in the fiber orientation cross-direction profile can be inferred or determined. If the wavelength $\lambda$ of the basis weight cross-direction profile is greater than a particular critical wavelength $\lambda_{krit}$, then a change in the outlet gap can be inferred or determined and with it, a corresponding change in the fiber orientation cross-direction profile.

The calculation of the wavelengths of the basis weight cross-direction profile can be carried out, for example, by a Fourier analysis or also by pattern recognition processes or similar, known processes of applied mathematics.

In FIG. 2b, the chronological course of the change in the basis weight of a moving paper web has been represented. This Figure shows a basis weight change, which, with its chronological course—i.e. its speed—lies in a range that indicates a temperature-dependent deformation of the headbox and, therefore, of the headbox nozzle or the headbox outlet gap. In the course of the basis weight represented in FIG. 2b, the higher frequency parts of the basis weight changes, which can stem, for example, from the constant part of the paper machine, are not depicted. These can be filtered out in a corresponding measurement process, for example, by suitable filter.

Figure 5B:
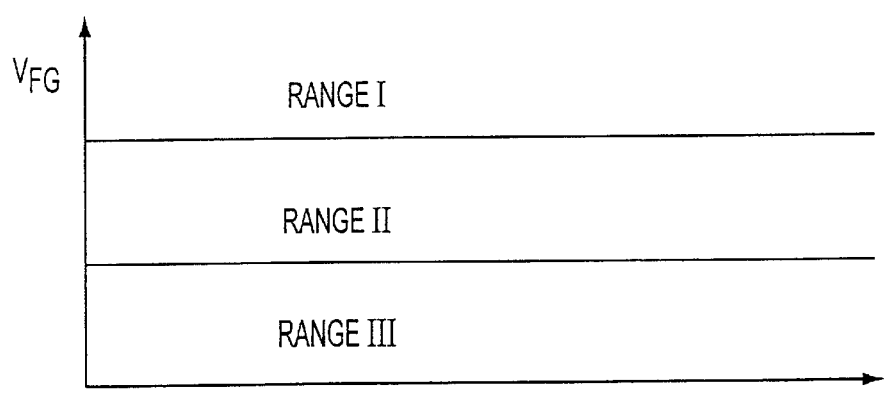

If the change speed $V_{FG}$ of the basis weight is taken into consideration, then it turns out that this criterion can also be used to detect a change in the fiber orientation cross-direction profile. Namely, if the basis weight changes with a relatively high frequency or high speed, then this cannot stem from a temperature-dependent deformation of the headbox and, therefore, also does not correspond to fluctuations in the fiber orientation cross-direction profile. Likewise, basis weight changes can occur with a very low speed, which are essentially caused by the appearance of wear in the operation of the paper machine and correspond to changes in the fiber orientation cross direction profile. However, if basis weight changes occur in a middle range, which likewise must always be determined as a function of the respective headbox, then a temperature-indicated deformation of the headbox or the headbox nozzle can be assumed and a corresponding influence on the fiber orientation cross-direction profile can be inferred or determined. This selection criterion of the change speed is depicted in FIG. 5b. The ranges I, II, III of the change speed of the basis weight are plotted here in a diagram. The ranges I and III are noncritical ranges with regard to the fiber orientation cross-direction profile, whereas when there is a change in the basis weight with a speed in the range II, a corresponding influence on the fiber orientation cross-direction profile can be inferred or determined.

The greatest reliability in the recognition of the change in a fiber orientation cross-direction profile can be obtained by virtue of the fact that the two previously mentioned methods are combined with each other. A corresponding schematic representation of this combination is plotted in FIG. 5c. A concatenation of the criteria from FIGS. 5a and 5b is shown, by means of which the ranges of the change speed of the basis weight cross-direction profile I, II, and III are divided into the ranges a and b. Since both the time response and the characteristic form have to be given as the characteristic wavelength of the gap change in the event of a change to the headbox gap due to thermal influences on the headbox, only the range IIb can be regarded as a criterion for an existing influence on the fiber orientation cross-direction profile.

Figure 5C:
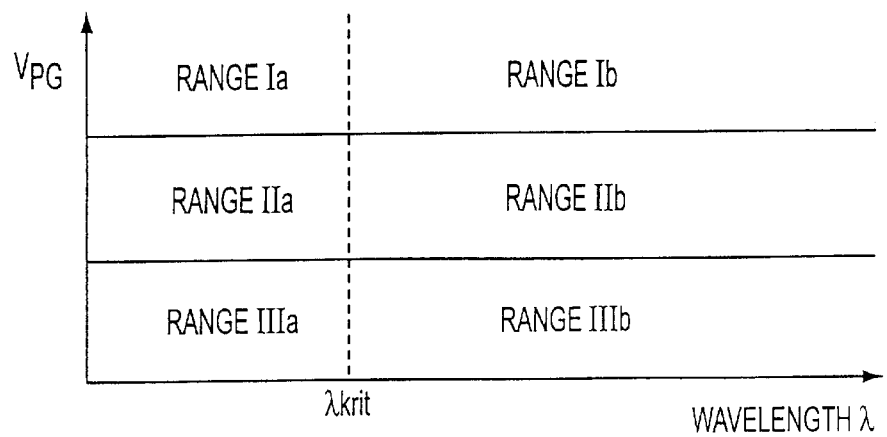
Figure 6:
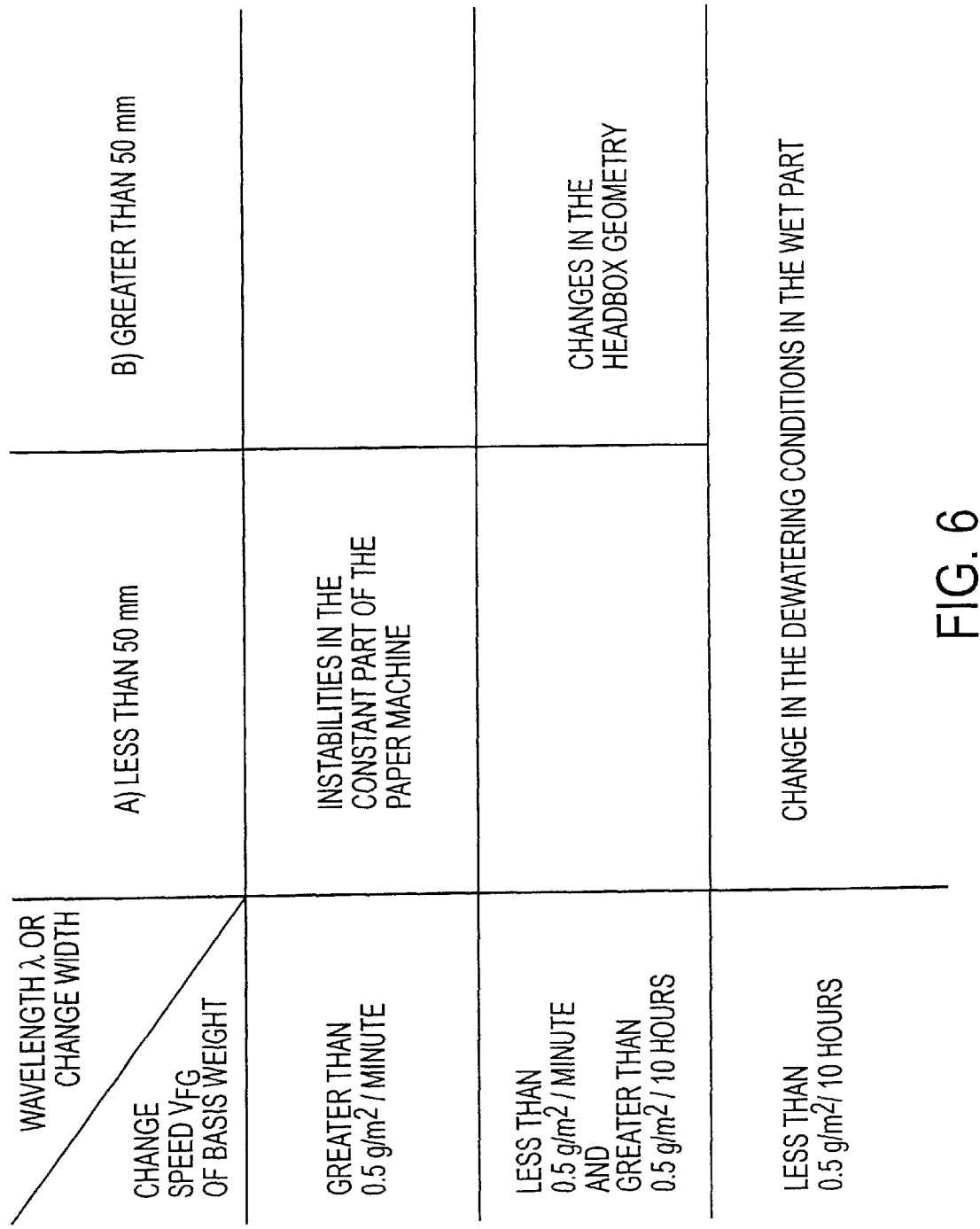
FIG. 6 is a table relating to the value raster from FIG. 5.

FIG. 6 depicts characteristic or preferred value rasters in table form. The corresponding wavelength range is plotted on the upper horizontal line in the table and the range of the change speeds is plotted on the left vertical line. The ranges Ia to IIIb depicted in FIG. 5c are disposed at the intersection points of the value ranges. The causes which lead to a characteristic change speed or a characteristic wavelength of the change are entered in the corresponding boxes.

To clarify the above, the ranges in FIG. 6 are explained below.

Range Ia:
The basis weight changes very rapidly here with basis weight change speeds greater than about 0.5 g/m² per minute within a narrow zone of the basis weight cross-direction profile of λ less than about 50 mm. This indicates fluctuations in the stock density or hydraulic instabilities in the stock delivery system.

Range Ib:
Here, there is a rapid change in the basis weight, with a wavelength or change width of λ greater than about 50 mm. The cause for this can be attributed to large fluctuations in the stock density and in the volume flow in the delivery system.

The ranges Ia and Ib give no indication of a change in the fiber orientation cross-direction profile since the cause for the basis weight change does not lie in a changed headbox geometry.

Range IIa:
Among other things, this range of the change speed gives an indication that the headbox geometry and, in particular, the nozzle geometry, i.e. the opening of the nozzle outlet gap as well, is the cause for a basis weight change. However, since the change width or the wavelength $\lambda<\lambda_{krit}$, it must be assumed that the deformation of the headbox cannot be the cause of the basis weight change because the headbox cannot arbitrarily deform. Possible characteristic deformations of the flow conduits lateral to the machine travel direction depend on the structural and static embodiment of the headbox. For example, the deformation will be minimal at locations with stiffening ribs, but will assume a maximum between them, for example when the internal pressure in the nozzle changes with a changed machine speed. The critical wavelength $\lambda_{krit}$ is therefore dependent on the respective headbox construction. In the known cases, the critical wavelength $\lambda_{krit}$ is greater than about 50 mm.

The range IIa thus also gives no indication of a change in the fiber orientation cross-direction profile.

Range IIb:
This range is characterized by change speeds of the basis weight and by change widths or wavelengths of the basis weight changes, which are produced by virtue of the fact that the headbox geometry is experiencing a change in the lateral direction. If the evaluation of the basis weight cross-direction profile that is measured "on line" yields change widths or wavelengths of the changes with $\lambda>\lambda_{krit}$ and if the change speed lies in the predetermined range, then there is a clear indication of a deformation of the outlet gap of the headbox nozzle. There is the possibility of calculating a gap width change Δs from the basis weight change ΔFG and from the transfer function Δs=F(ΔFG). In this connection, it is assumed that the geometrical changes, for example due to pressure, temperature, or the like, cause the local gap width change Δs, and this has resulted in the basis weight change ΔFG measured and, therefore, has also resulted in a change in the fiber orientation ΔFO.

The range IIb therefore gives a clear indication of a change in the fiber orientation cross-direction profile. There is thus the possibility of carrying out a corresponding correction intervention. With a sectionally adjustable orifice in the headbox nozzle, this can occur so that the basis weight cross-direction profile is corrected back to the original value by an adjustment of the orifice or, with a sectional volume flow-regulated headbox, this can also occur by a change in the sectional volume flows and a simultaneous adaptation of the stock density profile.

Ranges IIIa and IIIb:
These ranges are distinguished by means of a very slow change speed of the basis weight. These very slow changes in the basis weight cross-direction profile indicate a change in the cross-direction profiles of the screen permeabilities, for example due to screen wear or changed dewatering speeds or indicate a changed retention in the forming region.

These ranges thus give no indication of a changed fiber orientation.

Changes in the basis weight that lie in the ranges Ia, Ib, Ia, IIIa, and IIIb are, therefore, only corrected by an adaptation of the stock density cross-direction profile so that no additional or new lateral flows can be produced in the headbox nozzle.

The features discussed above indicate that a favorable to clear indication with regard to a fiber orientation change is possible by a corresponding consideration of the basis weight profiles in both the longitudinal and lateral direction. As a result, there is the possibility on the one hand of indicating to the paper maker the existence of a change in the fiber orientation cross-direction profile in order to deliberately give the manufacturer the possibility of a regulating intervention. However, due to the recognition of the presence or absence of a fiber orientation change, it is also possible to control the regulating interventions in a corresponding regulating circuit so that when there is a fiber orientation change, only those regulating interventions are carried out that correspond to a restoring of the fiber orientation change or, when there is no fiber orientation change, regulating interventions, which change only the basis weight profile, are carried out or corrected, without influencing the fiber orientation cross-direction profile.

FIGS. 7 to 10 show possible aspects of regulating processes or regulating devices according to the invention with regard to the fiber orientation cross-direction profile and the basis weight cross-direction profile. For the sake of clarity, only three actuators are respectively shown distributed over the machine width in the following Figs. This depiction does not correspond to an actual installation in a paper-making machine, since the number of actuators in an actual installation is significantly increased. For the explanation of the principle, though, it believed to be sufficient to show only three actuators in the schematic representations that follow.

Figure 7:
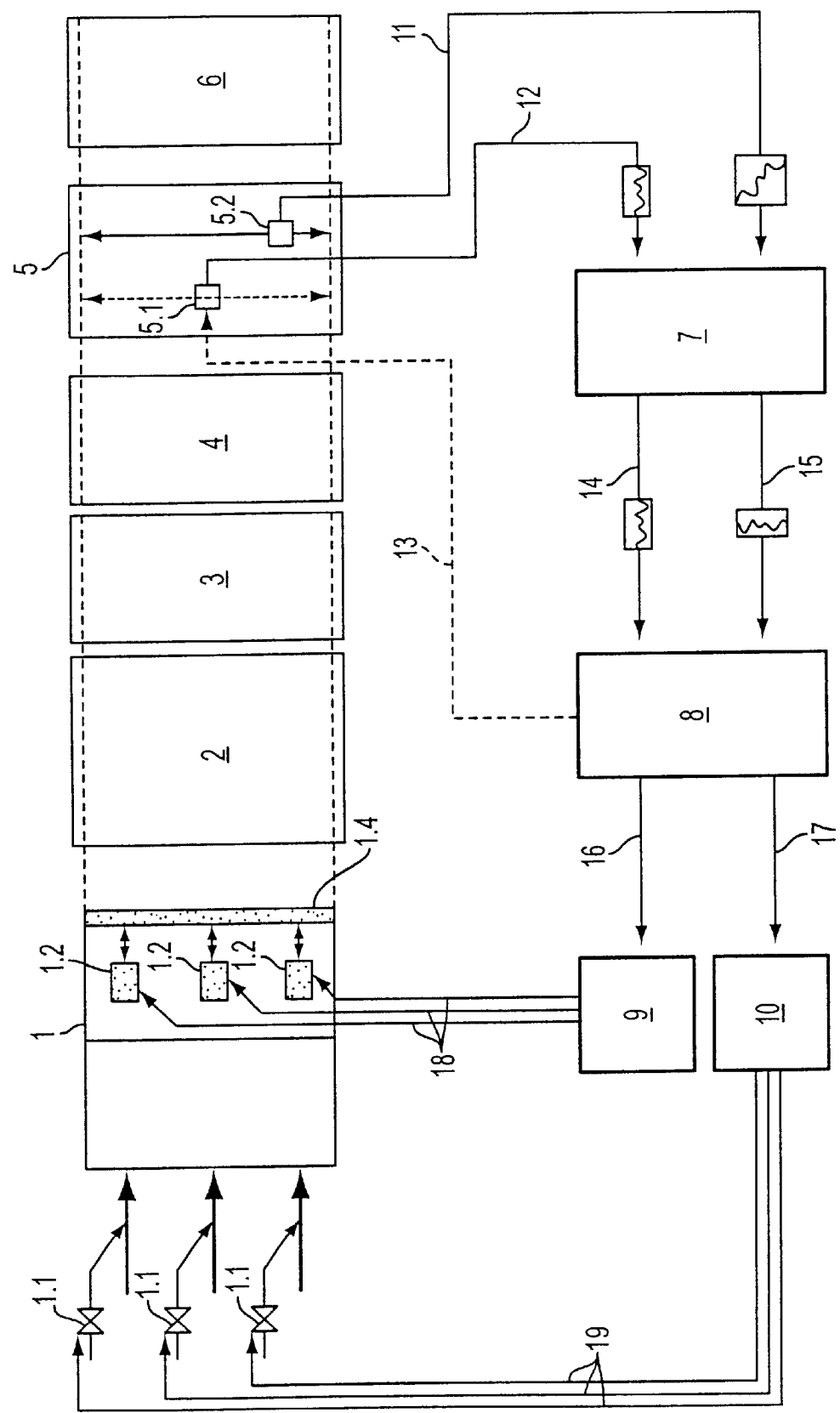
FIG. 7 is a schematic representation of a paper machine with a regulating device according to the invention and a sectionally stock density regulated headbox with regulated, sectional orifice adjustment.

FIG. 7 shows a schematic representation of a paper machine with the regulating circuit for controlling the basis weight cross-direction profile and fiber orientation cross-direction profile. The paper machine comprises the headbox 1, the subsequent former 2, a press section 3, and the drying section 4, as well as a winding device 6. Between the drying section 4 and the winding device 6, a measuring frame 5 is depicted, which on the one hand, has a sensor 5.1 that is substantially stationary and also has a sensor 5.2 that traverses over the machine width, both of which are for measuring the basis weight. The sensor 5.1 measures the basis weight longitudinal direction profile along a particular machine width. The sensor 5.2 indicates a basis weight profile that on the one hand contains portions of the pure basis weight cross-direction profile and also contains portions of the basis weight longitudinal direction profile. These two profiles are transmitted by way of the measurement or transmission lines 11 and 12 to an arithmetic unit 7, which calculates the pure longitudinal direction and cross-direction profiles from the two profiles measured.

The process for profile calculation has been disclosed, for example, by DE 20 19 975 and by DE 196 34 997. The disclosures of both documents is expressly incorporated herein by this reference herein, in their entireties.

After the determination of the separate basis weight longitudinal direction and cross-direction profiles, these determinations are transmitted by way of lines 14 and 15 to the arithmetic unit 8. The two profiles are analyzed in the arithmetic unit 8 according to the above-explained processes and a decision is made as to whether possibly existing changes in the basis weight cross-direction profile or existing changes in the basis weight in the basis weight longitudinal direction profile indicate a change in the fiber orientation cross-direction profile.

If a change in the basis weight cross-direction profile is determined and, as a result of the characteristic curve of the change due to its chronological and/or local behavior, it is determined that a change in the basis weight cross-direction profile has occurred with a simultaneously corresponding change in the fiber orientation cross-direction profile, then the control unit 9, which changes the actuators 1.2 of the orifice 1.4 of the headbox, is instructed by way of the line 16 to again produce the basis weight cross-direction profile. This applies, at least provided that these are corrections with widths/wavelengths above the critical wavelength. Corrections of smaller wavelengths—i.e. in the range IIa from FIG. 5c or the table in FIG. 6—are carried out with the aid of the sectional stock density regulation.

If it is detected that the change in the basis weight cross-direction profile has produced no simultaneous change in the fiber orientation cross-direction profile, then by way of line 17, the control unit 10 is instructed to initiate the basis weight cross-direction profile by way of a regulation of the stock density cross direction profile with the aid of the actuators 1.1.

An improvement of the device depicted can be achieved by virtue of the fact that the first sensor 5.1, which is installed in a stationary fashion during the measurement of the longitudinal direction profile, has a device that permits a deliberate positioning of the sensor along the machine width. In this manner, when there is a detection of a basis weight change with a change width that lies above the critical change width or above the critical wavelength $\lambda_{krit}$, there is the possibility of moving the sensor 5.1 to the location of this maximum and carrying out the change in the longitudinal direction profile substantially precisely at this location.

Figure 8:
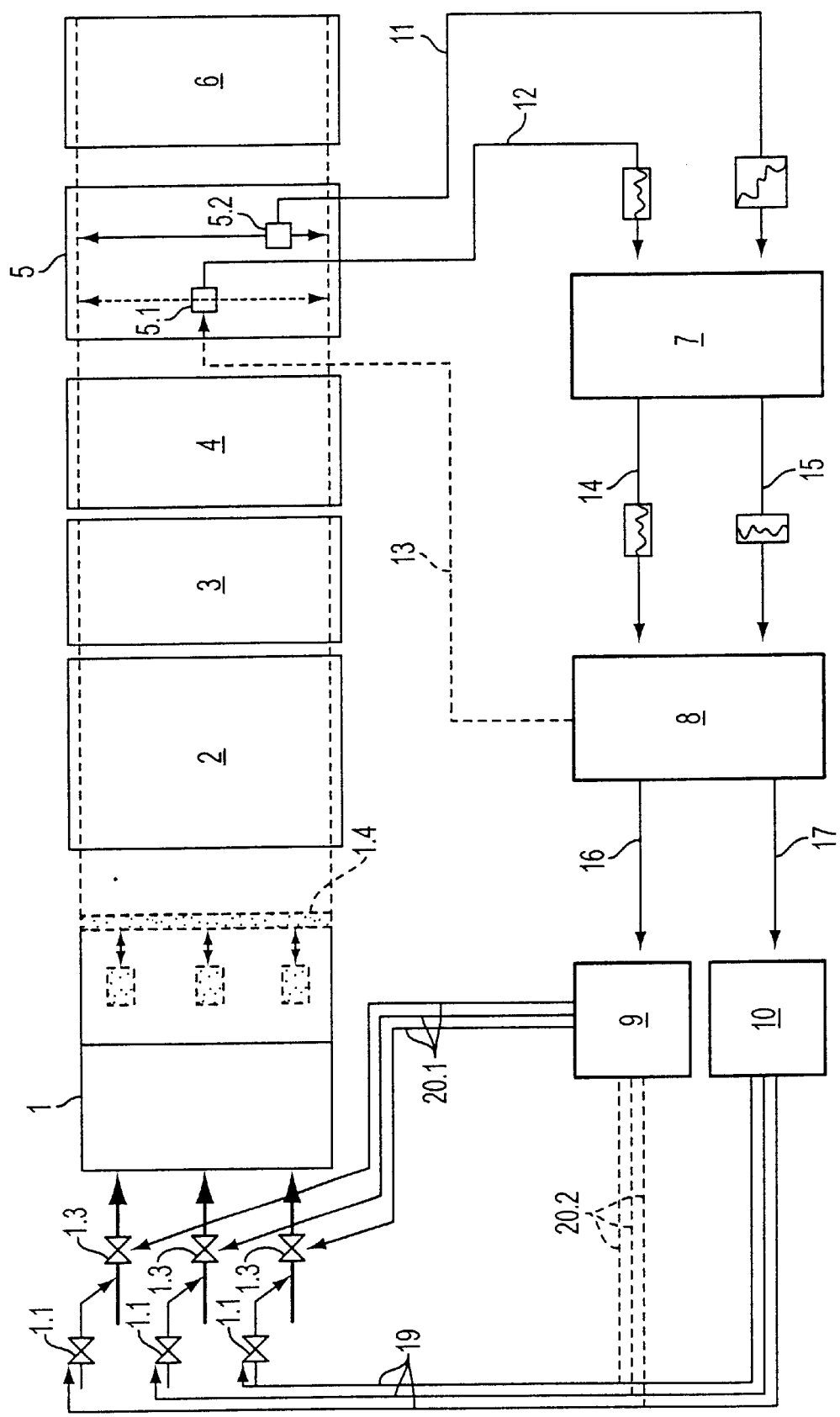
FIG. 8 is a schematic representation of a paper machine with a regulating device according to the invention and a sectionally stock density regulated and sectionally volume flow regulated headbox with orifice adjustment.

FIG. 8 shows another aspect of a paper machine with a regulating circuit according to the invention, and a headbox 1 with an orifice 1.4 that is not included in the regulating circuit. The mode of operation of this regulating circuit fundamentally corresponds to the mode of operation described in conjunction with FIG. 7, but in lieu of a change in the orifice gap, when there is a possibly existing change in the fiber orientation cross-direction profile, a change in the sectional volume flows is carried out in the headbox 1 by way of the actuators 1.3. Like the actuators 1.1, the actuators 1.3 are throttle devices. For example, the corresponding regulating process for correcting the fiber orientation with the aid of volume flow changes is described extensively in the above-discussed patent document DE 42 39 845, the disclosure of which is hereby expressly incorporated herein, in its entirety.

Figure 9:
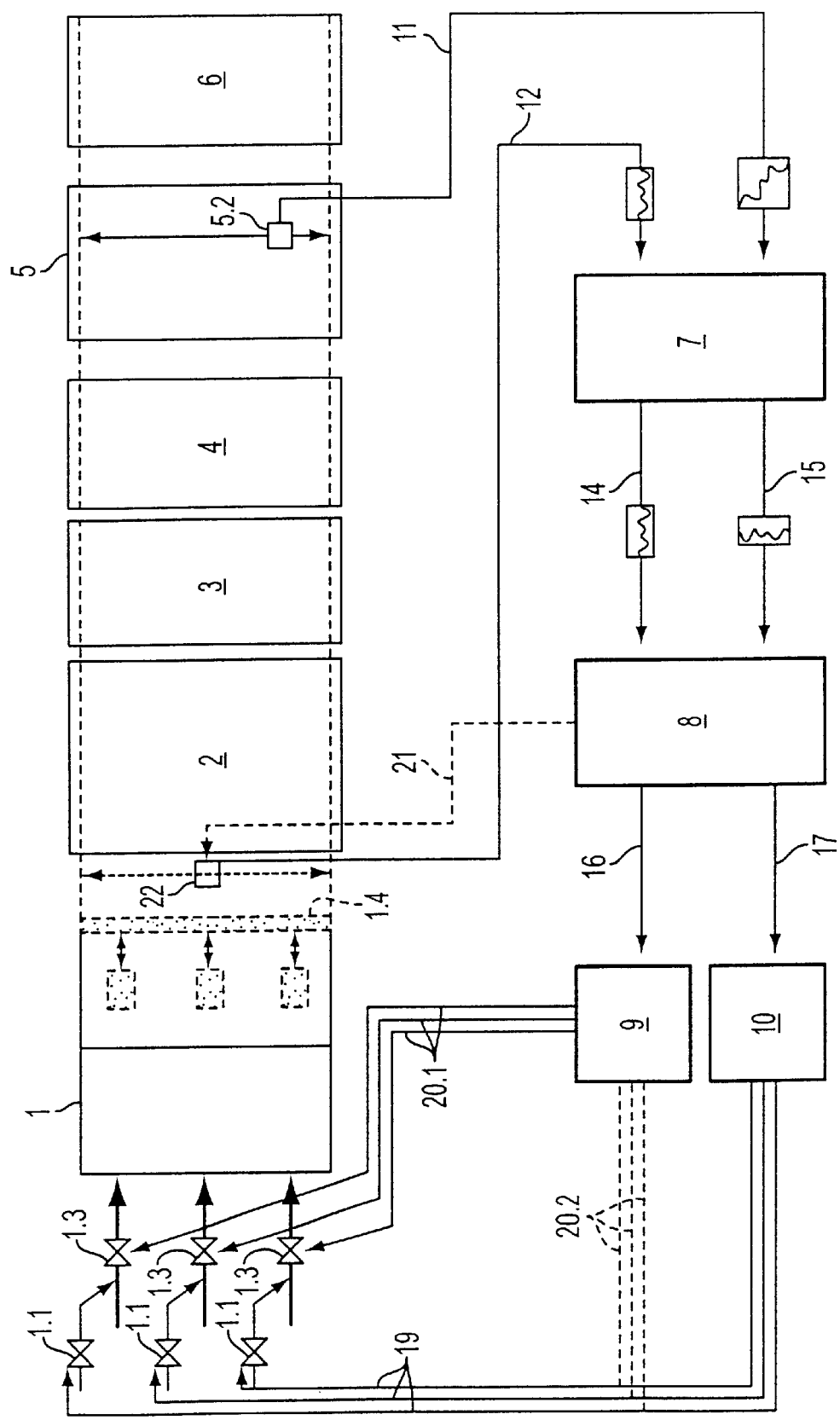
FIG. 9 is a schematic representation of a paper machine with a regulating device according to the invention and a sectionally stock density regulated and sectionally volume flow regulated headbox nozzle and the former part of the web or cardboard manufacturing machine; and, FIG. 10 is a schematic representation of a paper machine with a regulating device according to the invention and a sectionally stock density regulated and sectionally volume flow regulated headbox with regulated, sectional orifice adjustment and three sensors.

Another feature of a regulating device according to the invention is represented in FIG. 9. A difference of FIG. 9 in relation to FIG. 8 is that the first sensor 22 for measuring a basis weight longitudinal direction profile is not located after the drying section 4, but is attached directly to the outlet of the headbox nozzle. Consequently, the sensor 22 does not measure the basis weight itself but rather measures the mass of stock suspension emerging from the headbox, or measures the solids content in the stock suspension, or also measures only the density of the stock stream or also the density of the stock stream and the local stream speed. An improved detection of a change in the geometry of the headbox and, therefore, a change in the fiber orientation cross-direction profile can be achieved with the aid of these measured parameters, which are transmitted by way of the line 21 to the arithmetic unit 8 and are essentially connected directly to the geometric situation of the outlet gap of the headbox nozzle.

For the measurement of the pure basis weight cross-direction profile, despite the sensor 22 being attached to the outlet of the headbox nozzle, it can be advantageous, in addition to the traversing sensor 5.2, to provide another stationary or movable sensor 5.1 in the region of the measuring frame 5. The sensors discussed herein are suitable for measuring the stock density or for measuring the absorption of radioactive radiation, light, or ultrasound, or for measuring the stream density and/or the stream speed.

Figure 10:
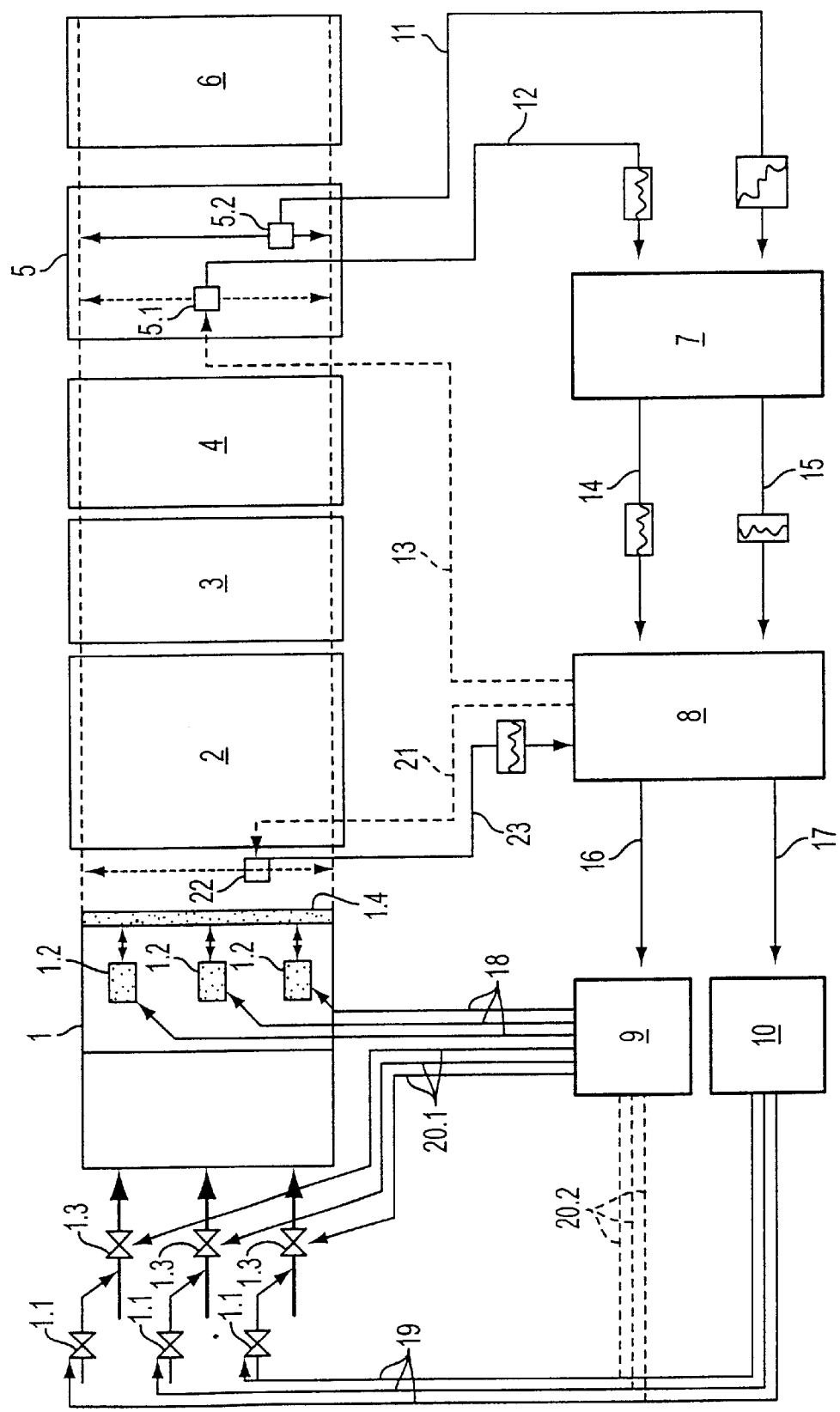

Another aspect of a paper machine according to the invention is shown in FIG. 10. with a regulating device for the basis weight cross-direction profile and the fiber orientation cross-direction profile is represented in FIG. 10. The design of the paper machine essentially corresponds to that described above in conjunction with FIGS. 7 to 9. The essential difference in this aspect lies in that on the one hand, a sensor 22 directly downstream of the headbox measures a longitudinal direction profile of a magnitude that corresponds to the basis weight and transmits this longitudinal direction profile to the arithmetic unit 8 by way of the measurement or transmission line 23. The arithmetic unit 8 receives the information of the corrected basis weight longitudinal direction and cross-direction profile from the arithmetic unit 7 by way of the data lines 14 and 15. The arithmetic unit 8 controls the positioning of the sensor 22 by way of the control line 21 and controls the positioning of the sensor 5.1 by way of the control line 13 so that the sensors are each disposed in a maximum of the change in the basis weight cross-direction profile and consequently there is an optimal evaluation of the data measured with regard to the possibility of a change in the fiber orientation cross-direction profile.

The decision as to whether there is a change in the fiber orientation cross-direction profile occurs in the arithmetic unit 8 in accordance with the above-described criteria. Correspondingly, the commands for correction of the basis weight cross-direction profile are transmitted by way of the data lines 16 or 17 to either the arithmetic unit 9 or the arithmetic unit 10. As in the above-described devices of FIGS. 7 to 9, the arithmetic unit 10 is responsible for the correction of the stock density cross-direction profile in the headbox and by way of the actuators 1.1, corrects the basis weight of the paper web without bringing about a change in the fiber orientation cross-direction profile.

The arithmetic unit 9 is responsible for the correction of the basis weight cross-direction profile with a simultaneous correction of the fiber orientation cross-direction profile. In this instance, on the one hand, corrections can be carried out at the actuators 1.3 by way of the control lines 20.1 in order to change the fiber orientation cross-direction profile combined with the basis weight cross-direction profile. On the other hand, the orifice can also be provided for adjusting the basis weight cross-direction profile with a combined adjustment of the fiber orientation cross-direction profile by way of the data lines 18 and the actuators 1.2 of the orifice 1.4.

The combination of the adjustment possibilities by the arithmetic unit 9, by way of the two control lines 20.1 and 20.2 for the actuators 1.1 and 1.3 and additionally by way of the actuators 1.2 of the orifice 1.4 on the one hand, permits the provision of a significantly greater adjustment range and on the other hand, also permits the fiber orientation cross-direction profile to be corrected by way of an adjustment of the actuators 1.1 and 1.3 in a manner so that they are matched to one another, without influencing the basis weight cross-direction profile. To this end, in the desired section of the headbox, the sectional volume flow is changed by an adjustment of the corresponding actuator 1.3 and at the same time, the concentration of this sectional volume flow is changed by way of the actuator 1.1 so that the sum of the solids flowing through this section remains constant despite the change in the volume flow of the stock suspension.

It goes without saying that the arithmetic units 7, 8, 9, and 10 represented in the FIGS. 7 to 10 can in actual use be individual, physically separate arithmetic and control units, but it likewise corresponds to the concept of the invention if these arithmetic units 7 to 10 work in a single process guidance system, which as a rule carries out the individual evaluation, decision-making, and control procedures in a program-controlled manner. Other combinations of hardware and software or computing, evaluation, and control units are possible without departing from the scope of the invention. It is likewise possible to attach the sensor 22 in other positions in the paper machine.

With the embodiments shown above, it is now possible—in contrast to the background information—to infer or determine, by means of an "on line" process, a change in the fiber orientation cross-direction profile by an "on line" measurement of the basis weight cross-direction profile and/or of the basis weight longitudinal direction profile or other measurement quantities that correspond to these profiles, and furthermore, to allow this information to influence an "on line" regulating system in order to respectively adjust the correct production parameters in the headbox. These above-described processes offer significantly better results in the regulation of the headbox during the manufacture of a paper or cardboard web so as to provide a paper quality that is significantly improved overall.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiment, the present invention is not in tended to be limited to the particulars disclosed herein, rather, the present invention extends to all functionally equivalent structures, methods and uses, such as are within the scope of the appended claims.

What is claimed is:

1. A process for detecting a change in a fiber orientation cross-direction profile of a paper or cardboard web in a manufacturing process on a paper or cardboard manufacturing machine, comprising:

determining a change in the fiber orientation cross-direction profile in the web by determining at least one of a characteristic change in a basis weight cross-direction profile and a characteristic change in the basis weight in a travel direction of the web, wherein at least one measured quantity correlated to the characteristic change in the basis weight cross-direction profile and correlated to the characteristic change in the basis weight in the travel direction of the web may be substituted for a characteristic change in the basis weight cross-direction profile and a characteristic change in the basis weight in the travel direction of the web.

2. A process for detecting a change in a fiber orientation cross-direction profile of a paper or cardboard web in the manufacturing process on a paper or cardboard manufacturing machine, comprising:

repeatedly determining a basis weight cross-direction profile of the web;

determining change in the basis weight cross-direction profile;

determining wavelengths of the change in the basis weight cross-direction profile; and, comparing the wavelengths of the change in the basis weight cross-direction profile to a predetermined value raster for determining if the change corresponds to a change in the fiber orientation.

3. The process of claim 2, further comprising:

determining that a change in the fiber orientation cross-direction profile has occurred when the wavelength of the change in the basis weight cross-direction profile is greater than a predetermined value; and, determining that the fiber orientation cross-direction profile is unchanged when the wavelengths in the basis weight cross-direction profile is less than a predetermined value.

4. A process for detecting a change in a fiber orientation cross-direction profile of a paper or cardboard web in the manufacturing process on a paper or cardboard manufacturing machine, comprising:

determining a chronological course of a basis weight of the web in at least one position of the web with respect to a width of the machine;

determining a chronological change in the basis weight in the at least one position;

determining one of a change speed and a relative change speed of the basis weight in the at least one position;

comparing said one of the change speed and the relative change speed to a predetermined value raster for determining if said one of the change speed and the relative change speed corresponds to a change in the fiber orientation cross-direction profile.

5. The process of claim 4, further comprising:
determining that a change in the fiber cross-direction profile has occurred when said one of the change speed and relative change speed of the basis weight at one position is greater than a first predetermined value and less than a second predetermined value.

6. The process of claim 4, further comprising:
repeatedly determining a basis weight cross-direction profile of the web;
determining change in the basis weight cross-direction profile;
determining wavelengths of the change in the basis weight cross-direction profile; and,
comparing the wavelengths of the change in the basis weight cross-direction profile to a predetermined value raster for determining if the change corresponds to a change in the fiber orientation.

7. The process of claim 6, further comprising:
determining that the change in the fiber orientation cross-direction profile has occurred when the wavelength to the change in the basis weight cross-direction profile is greater than a first predetermined value and less than a second predetermined value; and,
determining that the change in the fiber cross-direction profile has occurred when said one of the change speed and the relative change speed of the basis weight at one position is greater than a predetermined value and less than another predetermined value.

8. The process of claim 3, wherein the predetermined value of the wavelength is one of less than or equal to about 0.5 m, which is in a range of at least about ⅕ of the width of a headbox and about ½ an inside width of the headbox of the paper or cardboard web manufacturing machine.

9. The process of claim 5, wherein a critical range of the change speed is between about 0.5 g/m² per minute and about 0.5 g/m² per 10 hours.

10. A process for detecting a change in a fiber orientation cross-direction profile in a paper web, comprising:
measuring a basis weight cross-direction profile and a basis weight longitudinal direction profile of the paper web by using two sensors;
determining existence of a deformation of a headbox in a machine manufacturing the paper web by determining a wavelength of a change in the basis weight cross-direction profile;
determining a course of the basis weight longitudinal direction profile at a position of a maximum change in the basis weight cross-direction profile; and
determining the existence of deformation of the headbox and influence of the deformation on the fiber orientation cross-direction profile from one of a characteristic chronological course of the basis weight and change of speed of the web.

11. The process of claim 2, further comprising:
determining a change in the basis weight indirectly by determining a change in a gap width profile of an orifice at an outlet gap of a headbox nozzle in the machine.

12. The process of claim 4, further comprising:
determining a change in the basis weight indirectly by determining a change in an actuator for setting a gap with of an orifice at an outlet gap of a headbox nozzle in the machine.

13. The process of claim 4, further comprising:
determining a change in the basis weight indirectly by determining a change in a flow rate of solids in sections of a headbox in the machine.

14. The process of claim 4, further comprising:
determining a change in the basis weight indirectly by determining a change in actuators for adjusting a flow rate of solids in sections of a headbox in the machine.

15. The process in accordance with claim 2, further comprising:
counteracting the change in the fiber orientation cross-direction profile by adjusting an orifice in a headbox of the machine.

16. The process of claim 2, further comprising:
counteracting the change in the fiber orientation cross-direction profile by changing a flow rate of a stock suspension in at least one section of a headbox in the machine.

17. The process of claim 16, wherein the flow rate of the stock suspension is one of increased and decreased in said at least one section of the headbox.

18. The process of claim 1, comprising:
correcting a change in the basis weight cross-direction profile and the fiber orientation cross-direction profile in at least one position of a traveling paper web, by using a sectionally stock density-regulated headbox of the paper or cardboard web manufacturing machine, including an adjustor for sectionally influencing an outlet gap of the headbox; and, during correcting of the basis weight cross-direction profile, in order to detect a change in the fiber orientation cross-direction profile, said process for detecting a change in the fiber orientation cross-direction is performed;
wherein, when a change in the fiber orientation cross-direction profile is detected, a correction of the basis weight cross-direction profile is performed by adjustment of the outlet gap of the headbox, when a change in the fiber orientation cross-direction profile is unnecessary, the correction of the basis weight cross-direction profile is performed by changing a profile of the stock density.

19. The process of claim 1, comprising:
correcting a change in the basis weight cross-direction profile and the fiber orientation cross-direction profile in at least one position of a traveling paper web, with a sectional stock density-regulated and sectional volume flow-regulated headbox; and, during correcting of the basis weight cross-direction profile, in order to correct a change in the fiber orientation cross-direction profile, the detection process is performed;
wherein, when a change in the fiber orientation cross-direction profile is detected, a correction of the basis weight cross-direction profile is performed by changing the sectional volume flow in the headbox, and when a change in the fiber orientation cross-direction profile is unnecessary, the correction of the basis weight cross-direction profile is performed by changing a profile of the stock density.

20. A process for detecting a change in a fiber orientation cross-direction profile of a paper or cardboard web in the manufacturing process on a paper or cardboard manufacturing machine, comprising:

determining one of a basis weight cross-direction profile of the web or a cross-direction profile of a correlated measured quantity by using at least one sensor;

determining a change in said one of the cross-direction profile of the basis weight and the correlated measured quantity by using at least one determining device;

determining wavelengths of the changes by at least one wavelength measuring device;

comparing the wavelengths of the cross-direction profile of the changes to a predetermined value raster for determining if the change corresponds to a change in the fiber orientation cross-direction profile by using a comparing element; and indicating the change in the fiber orientation cross-direction profile in an output unit.

* * * * *